United States Patent [19]

Collin

[11] 4,181,812
[45] Jan. 1, 1980

[54] IRON OXIDE MELT REDUCTION FURNACE AND METHOD

[75] Inventor: Per H. Collin, Falun, Sweden

[73] Assignee: ASEA Aktiebolag, Vasteras, Sweden

[21] Appl. No.: 890,246

[22] Filed: Mar. 27, 1978

Related U.S. Application Data

[63] Continuation-in-part of Ser. No. 816,217, Jul. 15, 1977, abandoned.

[30] Foreign Application Priority Data

Mar. 28, 1977 [SE] Sweden ................................ 7703568

[51] Int. Cl.² ............................................. F27B 14/00
[52] U.S. Cl. ............................................. 13/35; 13/32
[58] Field of Search ............................ 13/32, 35, 33, 9

[56] References Cited

U.S. PATENT DOCUMENTS

| 3,804,969 | 4/1974 | Treilhard | 13/35 |
| 3,885,082 | 5/1975 | Hanas | 13/35 |

FOREIGN PATENT DOCUMENTS

| 15645 | 7/1909 | United Kingdom | 13/32 |

*Primary Examiner*—Roy N. Envall, Jr.
*Attorney, Agent, or Firm*—Kenyon & Kenyon

[57] ABSTRACT

An iron oxide melt reduction furnace has a hearth with a raised periphery forming an annular shelf, the hearth holding a carbonaceous iron melt up to a level forming a thin layer on the shelf. The furnace side wall extends upwardly from the periphery of the hearth's shelf, and means are provided for feeding material containing iron oxide to the melt at a location inside of the shelf, for reduction of the oxide by the melt's carbon. Means are provided for feeding solid steel scrap to the hearth's shelf and the shallow melt layer thereon so as to maintain on the shelf an annular pile of the scrap sloping downwardly from the furnace side wall to the inner periphery of the shelf. The scrap, inherently of lower carbon content than the carbonaceous iron melt, adulterates and thereby lowers the carbon content of that shallow layer, this raising the melting temperature of the shallow layer while reducing its temperature, thus forming adjacent to the furnace's side wall a relatively low-temperature mixture that is partially solid and partially liquid metal, which together with the scrap between that mixture and the inner periphery of the shelf, protects the side wall lining from the destructive attack that otherwise occurs when it is contacted by the upper level of the melt and the slag formed by the reduction of the oxide and floating on the melt.

2 Claims, 5 Drawing Figures

IRON OXIDE MELT REDUCTION FURNACE AND METHOD

BACKGROUND OF THE INVENTION

This is a continuation-in-part of original application Ser. No. 816,217, filed July 15, 1977, now abandoned which like the present application, was concerned with the melt reduction practice of reducing iron oxide to iron.

Fundamentally, the melt reduction of iron oxide involves the continuous feeding of material containing iron oxide, exemplified by iron ore partially reduced by a prior treatment, in powdered or granulated form to a carbonaceous iron melt, the carbon of which reduces the iron oxide to crude iron, the melt being tapped from time to time or possibly continuously to form a supply of crude iron for further processing. The carbon content of the melt is maintained by supplying it with carbonaceous material, possibly mixed with the iron oxide feed, as required.

With the material fed normally being powdered iron ore, possibly partly reduced by a prior treatment, large volumes of slag are produced. When the furnace is an electric DC arc furnace, the melt receives a stirring action which is helpful in obtaining the desired reduction rapidly. At the slag level of the furnace side wall which extends upwardly from the hearth containing the melt, where the side wall is ultimately contacted by the melt and slag, possibly by both at once, rapid side wall destruction is possible. The melt necessarily heated to very high temperatures, supplies heat maintaining the slag hot at the slag level. Furnace side wall cooling in the usual manner, as by water-cooling methods, is not very effective in reducing the attack rate.

The above indicated problem also exists to a substantial degree in the case of a furnace heating the melt by partial combustion of carbon, carbon monoxide and hydrogen gas, particularly if means are provided for stirring the melt to accelerate the desired reduction.

SUMMARY OF THE INVENTION

According to the present invention, the furnace is provided with a hearth having a raised periphery forming an annular shelf, the hearth being designed to hold the carbonaceous iron melt containing the carbon required for the reduction, up to a level forming a layer on the shelf which is shallow as compared to the melt depth inside of the shelf. In other words, the furnace hearth is formed so that excepting for an annular area adjacent to the furnace side wall that extends upwardly from the hearth, the hearth is deep enough to contain the melt required for the iron oxide, melt reduction practice, but with the melt forming an annular shallow layer between that larger melt portion and the furnace side wall. The result of the above is that the melt motion or circulation which is desirable, is substantially smaller in the shallow rim of melt on the shelf, reducing the transfer of heat from the melt proper to that annular rim which contacts the furnace side wall.

In addition, according to this invention, means are provided for feeding steel scrap in relatively small pieces to the melt on the shelf, and so as to form an annular pile sloping from the furnace side wall downwardly to the inner periphery of the shelf. The steel scrap should be in small enough pieces to form that annular pile.

Now steel scrap inherently has a much lower carbon content than does the carbonaceous melt used for the reduction of the iron oxide; therefore, the melting temperature of steel scrap is higher than that of the carbonaceous melt having the substantially higher carbon content. Consequently, the annular pile of scrap forms a barrage resting on the shelf and inclining from the latter's inner periphery upwardly to the furnace side wall. The carbonaceous iron melt penetrates this barrier via the interstices between the scrap pieces which should be large enough not to pack solidly. This penetrating molten iron partially dissolves the bottom portion of the barrage or scrap pile because the steel at that location has its carbon content increased by exchange from the melt, with a consequent lowering of the melting point of the scrap, while at the same time, the carbon content of the penetrating melt is lower. Furthermore, the annular layer of melt is losing heat via the furnace side wall, and because of the reduced transmission of heat to it from the main body of the melt inside of the shelf's inner periphery. All of this results in the melt freezing inside of the lower portion, and possibly elsewhere, of the barrage so as to provide a protective wall between the melt and slag floating on the melt, and the furnace side wall where its lining would otherwise be subjected to direct attack by the melt and slag. To maintain the barrage or annular pile, the scrap pieces can be constantly fed to it close to the furnace side wall, this additionally having the effect of cooling the side wall because the scrap is, of course, cold and its partial or complete melting at the bottom of the barrage or pile constantly removes heat from the shallow layer of melt that has penetrated and partially frozen with the melt in that area.

By making the furnace hearth have its side wall capable of rotative reciprocation and with a roof that is rotatively immovable, with particulated scrap feeding conduits extending downwardly through the roof with lower ends over the outer periphery of the hearth's shelf, the annular scrap pile can be formed in a circumferentially uniform manner, the furnace side wall with its hearth, or in other words, the furnace vessel per se, being rotatively reciprocated during the scrap feeding. The roof and furnace side wall may be made substantially gas-tight by means of a seal permitting the relative rotation, such as by means of a sand seal.

Because the melt reduction results in the formation of a substantial amount of slag, the furnace roof is provided with an annular water-cooled wall which depends from the roof with a lower end spaced above the shelf at or at least adjacent to its inner periphery, so as to hold back at least some of the slag floating on the melt, it being possible if desired to keep almost all of the slag away from the annular scrap pile protecting the furnace side wall. Since this wall is water-cooled, the slag freezes on this wall and protects the wall itself from the slag reaction that might otherwise occur, the wall necessarily being made of a refractory excepting for its internal water-cooling conduits. In addition, this depending water-cooled wall forms between it and the furnace side wall an annular substantially gas-tight chamber, keeping in mind that if the furnace vessel is made reciprocatingly rotative, the seal between its side wall top and roof may be of the type permitting relative rotative movement between the two ports. Now, by introducing non-oxidizing pressurized gas to this annular chamber, the slag on the annular shelf can be kept at a level very substantially below what would normally be a much higher slag level on the inside of the annular wall and floating on the main body of melt.

To tap the growing melt to keep its level from unduly rising, one or more tap holes is provided through the furnace side wall bottom and leading from the hearth's annular shelf at substantially the level of the latter. The pile of steel scrap with its mixture of melt and solid pieces forming its base at such a tap hole, might result in impeding the flow of melt to the tap hole when tapping is desired. Therefore, at each tap hole a shaft leading upwardly with a bottom end extending to adjacent the bottom end of the water-cooled annular wall, is provided for maintaining a column of coke resting on the annular shelf throughout its area adjacent to the tap hole. The coke particles should be sized so that the melt can run through the interstices formed between the coke particles, for relatively easy flow to the tap hole, over the top of the shelf.

DETAILED DESCRIPTION OF THE DRAWINGS

The principles of this invention are illustrated by the accompanying drawings in which:

FIG. 1 schematically shows in vertical cross section an example of the new furnace in its basic form;

DETAILED DESCRIPTION OF THE INVENTION

Figure 1:
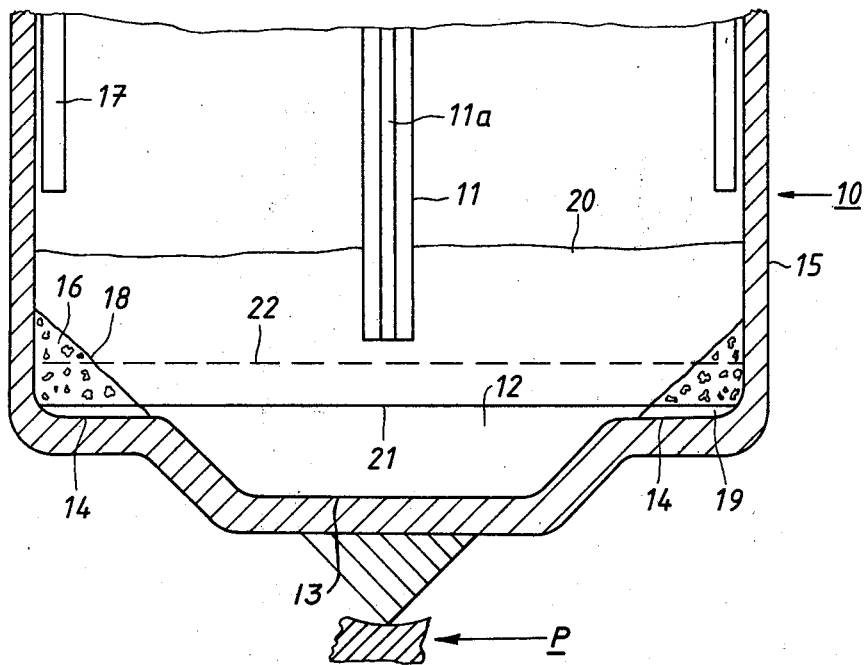
Figure 2:
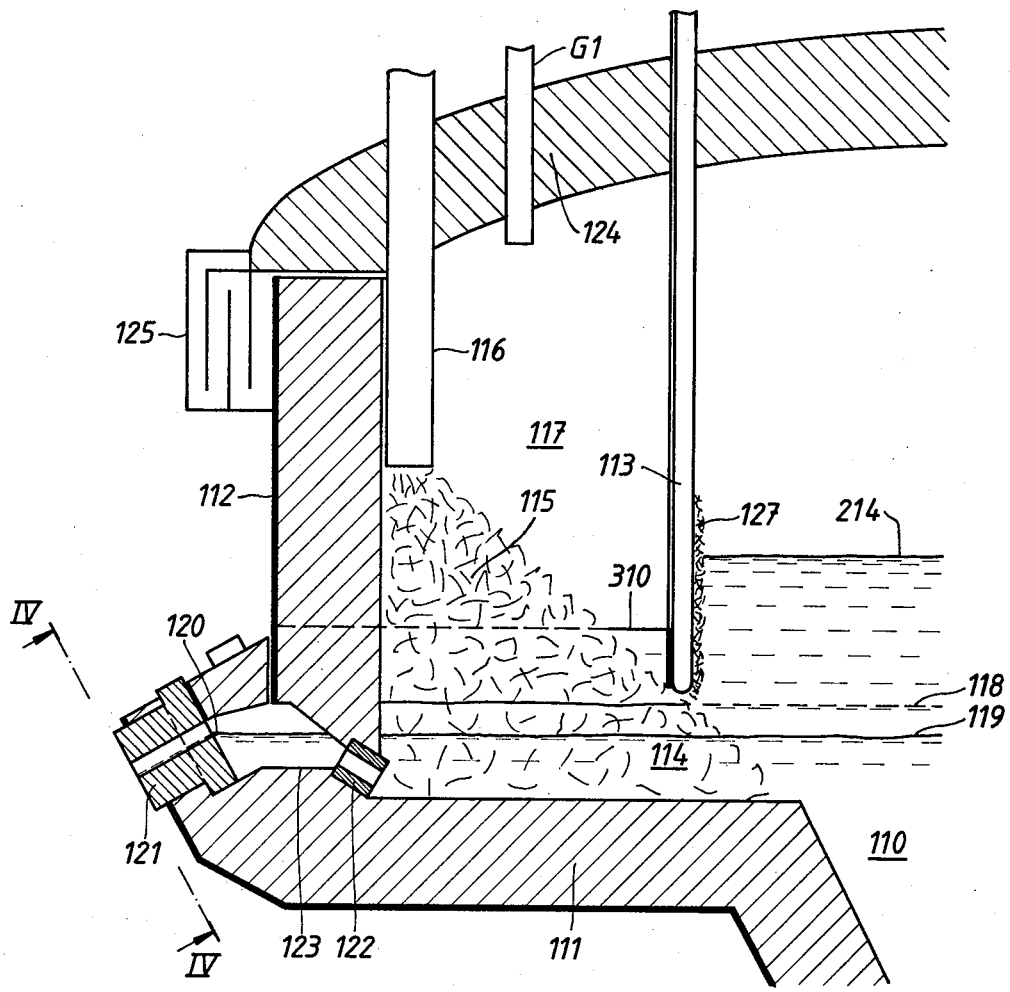
FIG. 2 is like FIG. 1 but shows the furnace in a modified and improved form.
Figure 4:
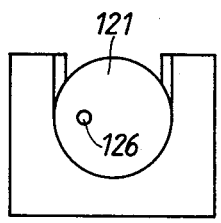
FIG. 4 is an end view of the tap hole looking as indicated by the arrows IV-VI in FIG. 2.
Figure 3:
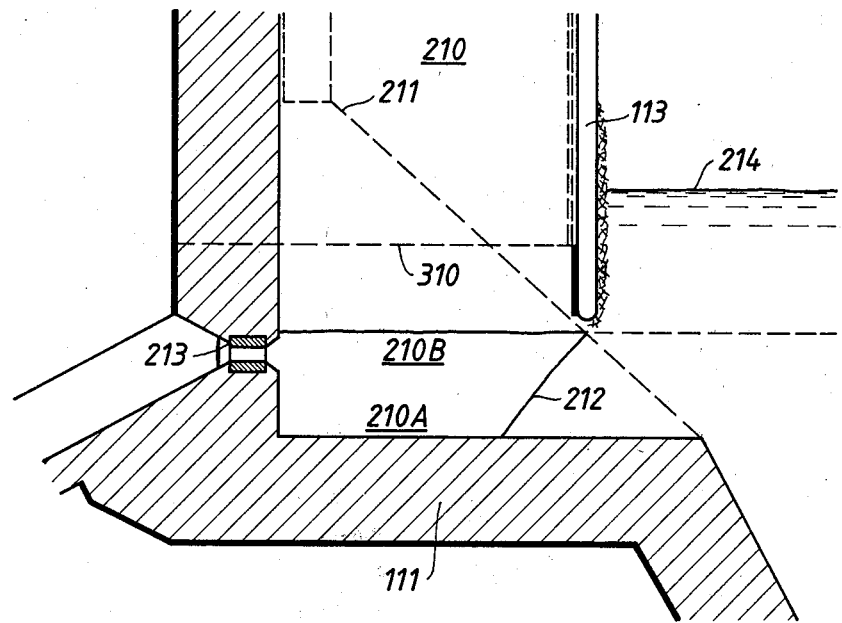
FIG. 3 is substantially the same as FIG. 2 but shows in broken lines the various levels of the annular scrap pile, the coke pile and the melt and slag levels.
Figure 5:
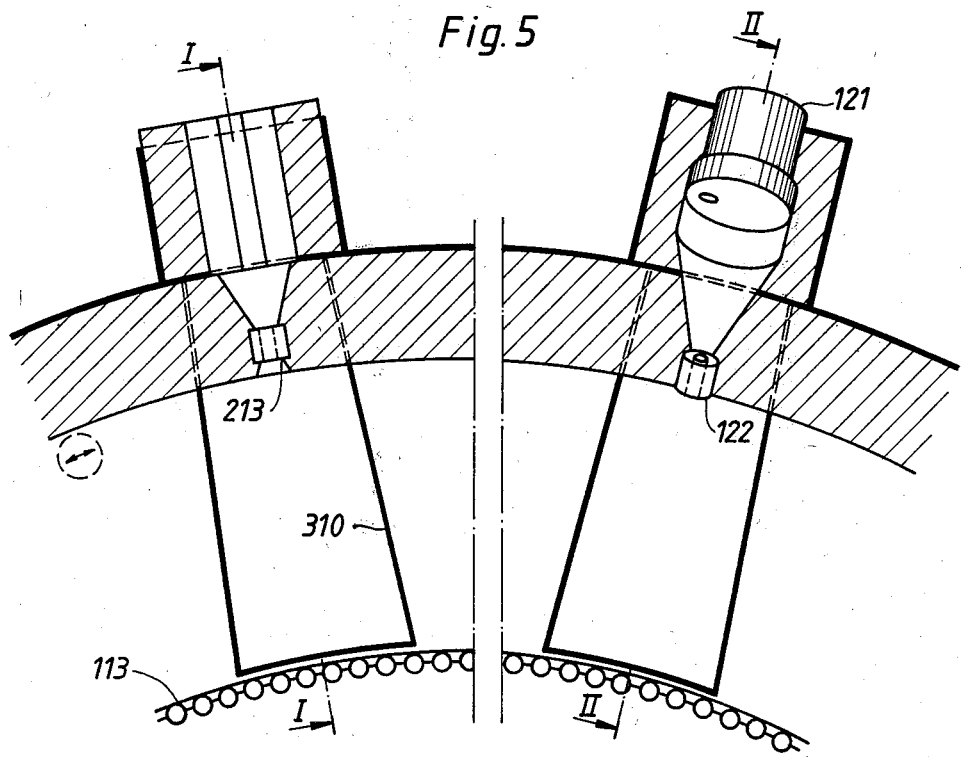
FIG. 5 is a horizontal cross section showing the arrangement of the tap hole and the shaft for containing the coke column.

Referring first to FIG. 1 of the above drawings, the bottomo portion of the furnace is shown at 10, an arcing electrode 11 being indicated for heating the melt and as having a central passage 11a through which the powdered iron oxide, normally partially reduced iron ore in powdered form, is fed. This feed may include a carbon supply, such as powdered coke, for maintaining the melt's carbon content at the high level required for the oxide reduction reaction. The carbonaceous iron melt to which such feeding is introduced, is indicated at 12 with its main body in the depressed portion of the hearth 13 and which extends upwardly to form the annular shelf 14 from the preiphery of which the side wall 15 extends upwardly. It is to be understood that this side wall has the usual refractory lining, not illustrated in detail. The annular pile of scrap pieces 16 is shown resting on the shelf 14 with the annular shallow layer of melt penetrating the bottom of this pile, the feed of scrap pieces being via the depending conduits 17 which open above the outer periphery of the shelf 14, the downwardly sloping contour of the scrap pile being indicated at 18.

As is illustrated, the shelf 14 has a substantially flat and horizontal surface as required to support the pile of steel scrap pieces against falling into the melt 12, and to provide for the shallow layer of melt penetrating the pile's bottom and which should be of substantially uniform depth.

The shallow annular layer of melt 19 is shown penetrating the scrap pile bottom with the thick layer of slag 20 floating on top of the entire melt and above the top of the annular pile 16, which top is up against the periphery of the side wall 15. The melt level is shown as being variable, its lower level being shown at 21 and its higher level being shown by the broken line 22.

In operation, DC power is used for the arc, a conventional melt connection (not shown) making the melt anodic with the arcing electrode functioning cathodically. With the melt having an adequately high carbon content and normally stirred by the action of the arc current transmitted through the melt, the melt receives a stirring action, but this action is greatly reduced within the shallow melt layer 19. The iron oxide feed, and if necessary, the feed of carbonaceous material, effected via the electrode passage 11a, continuously feeds the iron oxide to the melt 12 which, therefore, continuously increases in volume, normally controlled by either intermittent or continuous tapping of the hearth. The melt layer 19 penetrates the bottom of the annular scrap pile 16, maintained via feeding through the conduits 17, and with the scrap being steel which is conventionally of much lower carbon content than the carbonaceous melt 12, the latter while being cooled by the steel scrap and contact with the possibly cold furnace wall 15, feeds some of its carbon to the partially melting steel scrap, lowering the melting temperature. Because the main body of the melt 12 in the hearth portion 13 cannot transmit its heat so effectively to the shallow layer 19 on the shelf, particularly adjacent to the outer periphery of the shelf and, therefore, the side wall 15, a mixture forms that is partially solid and partially molten, and which may become completely frozen adjacent to the side wall 15 through which heat is alway escaping.

It can be seen that in the foregoing way the side wall is protected at the level between the melt 12 and the slag 20.

It is to be noted that iron having a carbon content of 4%, such as is effective for the melt reduction of the oxide, has a melting point of about 1250° C. Carbon-free iron has a melting point of about 1500° C., conventional steel scrap normally containing always some carbon but rarely having a carbon content of as much as 1%, usually substantially less carbon. A suitable melt temperature for the iron oxide reduction is in the area of 1450° C., maintained by the action of the arc or possibly other heat sources. Particularly when the arc is used, there is a substantial distance between the arc or point of heat input and the shallow layer of melt on the shelf. This shallow layer is inherently relatively free from any stirring action of the melt and the constant addition of steel scrap required to maintain the annular scrap pile, constantly removes heat from the shallow annular melt layer. This shallow layer is of constantly decreasing carbon content. All of these features contribute to the formation at the outer periphery of the shelf and the adjacent periphery of the furnace side wall, of a mixture of molten and solid ferrous masses which, adjacent to the furnace wall, becomes a completely solid mass with proper proportioning of the shelf size, the scrap feed and other factors involved.

Going now to FIGS. 2 through 5, the deeper portion of the hearth is shown at 110 with the shelf indicated at 111 and the furnace side wall being shown at 112.

In this case an annular water-cooled refractory wall 113 is shown as depending vertically above the shelf 111 and with a bottom edge or termination extending annularly around over the shelf adjacent to or at the latter's inner periphery and slightly above the annular shallow melt portion 114 overlying the shelf, with the bottom of the scrap pile 115, fed via the conduit 116, which may be one of several, so as to form the pile of scrap pieces slanting downwardly from the pile's highest level at the furnace side wall, going under the bottom of the annular wall 113 and extending to substantially the inner periphery of the shelf 111. The two possible melt levels are indicated at 118 and 119 and at 120 in a chamber having the level controlled by a rotating tapping nozzle 121 having an eccentric tapping hole 126 which by rotation of the nozzle can be adjusted at varying heights relative to the chamber 123 which communicates with the shallow melt layer 114 via a port 122. In this way the melt level of the shallow annular layer 114 is maintained between the limits indicated at 118 and 119. This requires continuous tapping of the melt which continuously grows in volume from the iron received from the reduced iron oxide or powdered iron ore.

Solely to meet the requirement for illustration, in FIG. 1 the furnace is represented as being mounted by a rotative and tilting pivot arrangement P.

During the reduction, large volumes of slag are produced. To keep the slag level 214 from rising in the scrap pile 115, the furnace roof 124 connects with the furnace side wall top via a sand or powder seal 125 permitting reciprocatory rotation of the furnace vessel, as described before, while with the side wall 113 depending gas-tightly from the furnace roof 124, results in the formation of an annular substantially gas-tight chamber 117 and by feeding pressurized non-oxidizing gas to this chamber as by via an inlet indicated at GI, can be maintained at a pressure above that existing in the furnace on the inside of the wall 113. In this way the slag can be held in the inner space at a level substantially above the slag layer in the space 117.

In addition to the action described before, in this case the slag freezes, as at 127, to form a layer on the inside of the water-cooled wall 113, protecting the latter from the slag action.

Because of the probability that the freezing action of the scrap and melt layer in front of the tapping nozzles communicating port 122 might block the latter, a shaft 310 of restricted circumferential extent is constructed so as to depend over the area of the shelf adjacent to the port 122, this shaft being designed to hold a column of coke pieces, indicated at 210 in FIG. 3, with its bottom resting on the shelf 111, as at 210A, and with its top indicated at 210B, and which may have the bottom of the column extending upwardly, the pile of coke thus formed having a negative angle as indicated as 212; that is to say, the slope of the scrap pieces is as described before and as is indicated at 211 in FIG. 3, the bottom of the coke column having an opposite angularity or backward angularity as indicated at 212 because the specific gravity of coke is very small as compared to that of the iron melt and the slag with its higher level 214. The bottom of the shaft for holding the coke column is indicated at 310 in FIG. 3, the much heavier liquid components holding the coke column inwardly. The coke column should be high enough to hold down its bottom via the weight of the coke extending upwardly. The coke particles should be of large enough particle size to permit the iron melt layer, which in this case does not freeze because of the presence of the steel scrap, to permit relatively free flow of the iron melt through the bottom of the coke column to the port 122.

When using this coke column feature, it is not very practical to rotate the furnace vessel relative to its roof. However, the scrap pile can be made circumferentially uniform where it extends from the sides of the coke column shaft, by providing an adequate number of the scrap feeding conduits 116. If the annular chamber 117 is fed with pressurized gas sufficient to hold up the slag, it is to be understood that undue escape of the gas via the conduits 116 can be prevented by keeping these conduits filled with the scrap particles, the gas fed via the inlet GI being maintained continuously.

If the coke column is formed by its shaft being supported via the furnace side wall only, the furnace vessel can be rotatively reciprocated as described before.

What is claimed is:

1. An iron oxide melt-reduction furnace comprising a hearth having a raised periphery forming an annular substantially flat and horizontal shelf, said hearth being adapted to hold an iron melt containing carbon up to a level forming a layer on said shelf which is shallow as compared to the melt depth inside of said shelf; a furnace side wall extending upwardly from the outer periphery of said shelf; means for feeding material containing iron oxide to said melt at a location inside of said shelf for reduction by the melt's said carbon; means for heating said melt; and means for feeding pieces of solid steel having a lower carbon content than said melt to said shallow melt layer on said shelf so as to maintain on the shelf an annular pile of the pieces with the pile supported by the shelf and sloping downwardly from said wall to substantially the inner periphery of said shelf, and in which said furnace has a roof from which an annular water-cooled wall depends with a lower end spaced above said shelf at least adjacent to its inner periphery so as to hold back at least some of any slag floating on said melt, said roof and side wall and water-cooled wall forming a substantially gas-tight annular chamber and said furnace having means for introducing pressurized gas to said chamber.

2. The furnace of claim 1 having a tap hole for tapping said melt from said shelf and means for holding a column of coke pieces above an area of said shelf adjacent to said tap hole and extending upwardly between said side wall and said annular water-cooled wall and holding back said pile of scrap pieces from said area.

* * * * *